March 15, 1966  H. E. GARDNER  3,239,891
PANEL STRUCTURE
Filed Sept. 24, 1963

INVENTOR
HOMER E. GARDNER

BY Beale and Jones
ATTORNEYS

United States Patent Office

3,239,891
Patented Mar. 15, 1966

3,239,891
PANEL STRUCTURE
Homer E. Gardner, Las Vegas, Nev.
(270 Ave. "B" NW., P.O. Box 804, Winter Haven, Fla.)
Filed Sept. 24, 1963, Ser. No. 310,997
7 Claims. (Cl. 20—19)

My invention relates to improvements in framed panel structure and particularly the corner joints therein.

An object of my invention is to provide panel structure having stile and rail members to receive a panel with a corner connection of the stiles and rails being accomplished by a protruding friction fit tongue on one of the members being received in a recess provided on the other member with the adjoining ends in abutting relation.

Another object of my invention is to provide a panel structure having framing members that are secured together by friction fit without holding screws, threaded apertures and the like.

A further object of my invention is to provide frames for panels wherein one of the frame members may be modified H-shape in cross section with transversely bent in spaced apart flanges at one edge forming a slot with the web of the member and the other of the frame members is of U-shape cross section with an end having the legs thereof cut away leaving the bight portion with a transversely bent end forming a tongue which is frictionally received by the recess of the other members.

Still further objects and the entire scope of applicability of the present invention will become apparent from the detailed description given hereinafter. It should be understood, however, that the detailed description and specific example is given by way of illustration only and, while indicating a preferred embodiment of the invention, is not given by way of limitation, since various changes and modifications within the spirit and scope of the invention will become apparent to those skilled in the art from this detailed description.

For a more complete understanding of the invention reference is had to the specification, claims and drawings in which;

Throughout the description like reference numbers refer to similar parts.

Figure 8:
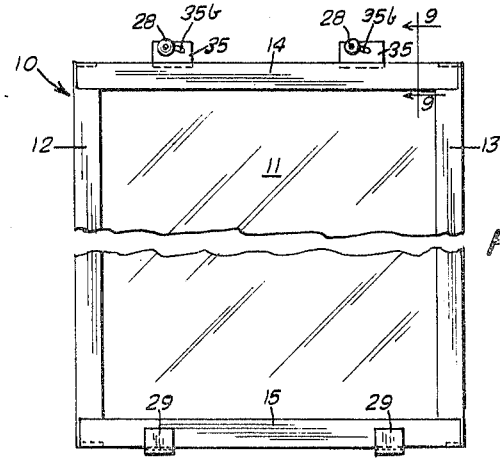
FIG. 8 is a side elevation of a panel structure on a reduced scale showing usage of the framing members and a roller hanger installed in the top frame member and slide guide members on the bottom frame member.

A panel structure is generally indicated at 10 in FIG. 8 and comprises a panel 11 of any desired material. It is enclosed by the novel frame structure which is fitted about the edges of the panel in a neat and tight manner without the use of any screws or the like.

The frame is comprised of side members or stiles 12 and 13 and top and bottom members or rails 14 and 15.

The stiles 12 and 13 are alike but oppositely disposed. So also the bottom and top rails 14 and 15 are alike but oppositely disposed.

Figure 1:
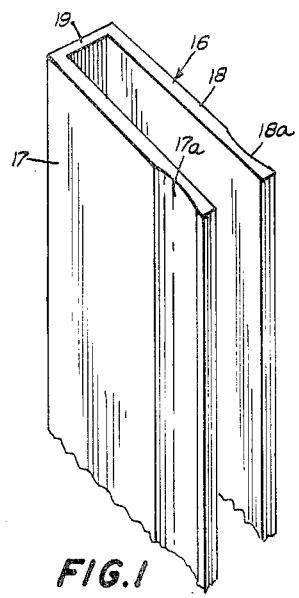
FIG. 1 is a perspective view of a U-shaped in cross section channel member from which one of the framing members is formed.

The stiles are made up from U-shape in cross section material such as extruded aluminum, however any suitable material may be used. The make up of the stiles will be described by reference to FIGS. 1, 2 and 3 for the most part. A piece of U-shaped in cross section stock is indicated at 16 and is comprised of the leg portions 17 and 18 extending from a bight portion 19. Each of the legs may have longitudinal recesses 17a and 18a in their outer faces adjacent their outer ends. These recesses 17a and 18a are relatively wide being about ⅓ the width of the leg and of relatively shallow depth of about 1/32″ for 1¼″ channel stock that has about 3/32″ thickness of material and a channel width of about 9/32″ in the illustration shown. These recesses 17a and 18a tend to make the outer portions of the legs 16 and 17 springy to better grasp and hold the panel 11. It will be observed in FIG. 2 that the upper end of the recess 17a there shown decreases in depth and melds into the straight edge 17b of the leg and to accomplish this the inside upper portion opposite 17b is slightly dished in at 17c. The same applies for the upper end of recess 18a at 18b and 18c. This improves the springyness and appearance. A die is used to form these recesses 17a and 18a and their portions.

Figure 2:
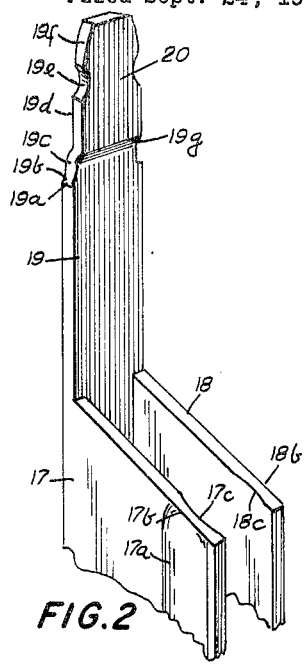
FIG. 2 is a perspective view of the U-shaped channel member having an end partially formed.

In FIG. 2 use is made of a die to form the ends of the stile at this step of its fabrication. The legs 17 and 18 are cut back so as to leave the bight portion 19 extending. A tongue portion 20 is formed at the outer end of the bight portion 19 for about ⅓ of the length of the extending bight portion. The edges of the bight portion in the tongue area 20 are cut away so as to provide a slightly tapered tongue to permit it to be inserted and to form a friction fit with its cooperating receiving recess portion in the adjacent rail end to be described.

The tongue 20 has an edge at each side starting at its inner end by a slightly tapered inward portion 19a, a transversely and inwardly extending portion 19b, a second slightly tapered inward portion 19c, a straight portion 19d parallel to the longitudinal axis of the tongue to about one half the length of the tongue, a concave portion 19e extending into the tongue toward the longitudinal axis and a terminal portion 19f of the edge tapering gradually inwardly toward the longitudinal axis. The width of the tongue between the parallel edge portions being substantially equal to the width between legs of rail member to be described so that a tight friction fit will be maintained on assembly.

Figure 3:
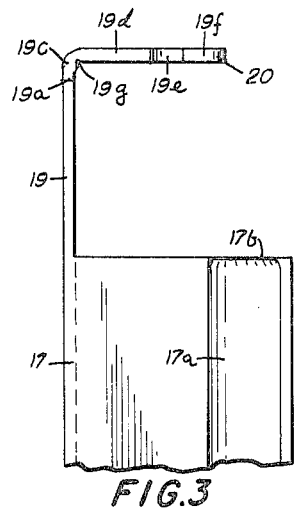
FIG. 3 is a side view of the U-shaped channel member in final form with a transversely extending tongue bent from the bight portion.

The bight portion 19 where it extends as the tongue 20 has on the inside face a transversely indented portion 19g to provide for a right angle inward bent as shown in FIG. 3 so that the tongue overlies the space between the legs 17 and 18.

Figures 4, 5:
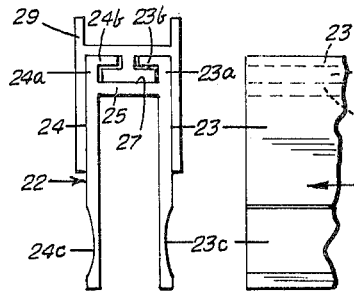
FIG. 4 is an end view showing a modified H-shape in cross section of another frame member.
FIG. 5 is a side view of the frame member of FIG. 4 showing an end and the rest fragmentary.
Figure 9:
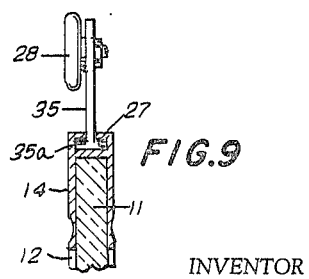
FIG. 9 is an enlarged view along line 9—9 of FIG. 8 showing installation of the roller hanger.

In FIGS. 4 and 5 the modified in cross section H-shaped rail 22 is shown. It has spaced apart parallel legs 23 and 24 with a transversely extending cross web 25 nearer one edge. The legs 23 and 24 have their end portions 23a and 24a bent inwardly as flanges 23b and 24b toward each other in spaced relation in the same plane and in spaced parallel relation to the cross web 25 thereby forming a recess 27 to receive the tongue 20 with a friction fit. The ends of the inwardly extending flanges 23b and 24b are spaced apart in the same plane, as shown in FIGS. 4 and 9, to form a longitudinal slot 27 to receive the roller hanger fitting 35 shown in FIG. 9. This hanger 35 has a T-shaped end 35a received in the recess designated 27. The upper end of hanger 35 has an inclined slot 35b, see FIG. 8, in its upper end to receive a roller fitting 28 so as to adjust its vertical position.

In FIGS. 4 and 5 the H-shaped member 22 is shown with its legs 23 and 24 formed with longitudinal recesses 23c and 24c adjacent their panel receiving ends in the same manner and for the same purpose as the recesses 17a and 18a in the U-shaped channel members.

Figure 6:
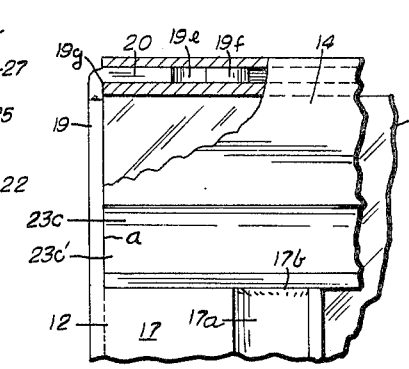
FIG. 6 is a side elevation of a corner of a panel construction using the frame members with a portion broken away to show the friction joint.
Figure 7:
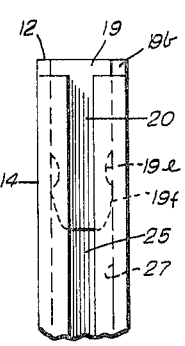
FIG. 7 is a top plan view of the corner of the panel structure shown in FIG. 6.

The top rail 14 in FIGS. 6, 7, 8 and 9 is the same as the specifically described rail 22 in FIGS. 4 and 5. The corner construction shown in enlarged scale in FIGS. 6 and 7 has the recess 27 of the top rail 14 there shown receiving the tongue 20 with a friction fit. The abutting and tight fit of the stile 12 with the top rail 14 is shown in FIG. 6. The ends of the recesses 17a at 17b and 23c at 23c' make a pleasing fit with the adjacent abutting members.

In FIG. 8 the bottom rail or side 15 of the frame has U-shaped fiber guide members 29 received thereover. The bottom rail 15 with its guides 29 is received in a suitable track (not shown).

It will be observed that this frame work does not require any screws or fasteners. The tongue 20 on the stiles is tightly received with a friction in the recess 27 of the rails. Special dies are utilized to form the ends of the stiles and upset and bend the same. The corners formed by the side and end members are uniform and thus there are no variations or exceptions and uniformly made stiles and rails are utilized according to the invention.

No threaded recesses or lug portions are required in the members, thus no problems of screw alignment is encountered. In case it is necessary to replace the panel 11, a sharp screw driver or instrument may be forced between the abutting joints of the rail 14 at a, for example, see FIG. 6, and the abutting stile 12 and the holding tongue 20 is removed from recess 27. This type of frame and panel construction lends itself to easy fabrication, is economical to manufacture and assemble and is highly attractive in appearance.

I claim as my invention:

1. A panel structure comprising top and bottom rails and side stiles forming a frame and a panel secured therein, said stiles having a U-shaped cross section with bight portion and legs extending therefrom and receiving the panel therebetween, said rails being of modified H-shape cross section having side legs and a cross web, the cross web being positioned in relatively close spaced relation to one edge and said one edge having flanges extending inwardly toward each other from the adjacent legs and forming said one edge of the rails, the space between the adjacent legs of the rails at the other side of the H-shape cross section from said transversely extending flanges receiving the adjacent edge of the panel, the transversely extending flanges on said rails being spaced from said cross web a distance approximately equal to the thickness of the bight portion of said stiles, said stiles at each end having their side portions removed to leave an extending bight portion of said U-shaped channel, said extending bight portion having the outer end portion thereof bent transversely in from the adjacent extending bight portion to form a tongue overlying in spaced relation therefrom the adjacent U-shaped channel portion of each stile, each end of said top and bottom rails being received in abutting relation at the ends of the side stiles and having the transversely extending bight portions of the stiles frictionally received and securely held in the respective adjacent ends of the rails in said space between its cross web and said inwardly extending flanges.

2. A panel structure according to claim 1 wherein said tongues on said stiles have their opposite side edges tapering very gradually towards each other and of an approximate transverse width intermediate the ends of the tongue portion equal to the width between the legs of said H-shaped in cross section rail members whereby easy assembly is permitted and a tight friction fit of tongue in the rails is maintained to hold said panel structure firmly together at its corners.

3. A panel structure according to claim 1 wherein said tongues on said stiles have a longitudinal axis therethrough and have the opposite edges starting at the inward end of the tongue defined by a slightly tapered inward portion, a transversely and inwardly extending portion, a second slightly tapered inward portion, a straight portion parallel to the longitudinal axis of the tongue to about one half the length of the tongue, a concave portion extending into the tongue toward its longitudinal axis and a terminal portion of the edge tapering gradually inwardly toward the longitudinal axis, said tongue having a width between said parallel edge portions substantially equal to the width between the legs of said rail members at said flanged edge portion.

4. A panel structure according to claim 1 wherein said tongue on said stiles has the edges of the bight portion of which it consists cut away at each edge to form a friction fit with the adjacent ends of each rail in said space between the legs, flanges and cross web thereof and wherein the inside portion of the bight of the stiles between the inner end of the tongue and the adjacent bight portion has a transversely inwardly extending notch therein at the bend of said transversely extending tongue.

5. A panel structure according to claim 1 including a roller support hanger member having an inverted T-shaped in cross section leg received in the space of said top rail edge between said inturned flanges, the adjacent legs and the cross web, said leg having an adjustably positioned roller means extending transversely thereto adjacent its outer most portion.

6. A corner structure in a frame for a panel comprising a side stile and an adjoining rail member, said stile having a U-shaped cross section with bight portion and legs extending therefrom to receive a panel therebetween, said rail being of modified H-shape cross section having side legs and a cross web, the cross web being positioned in relatively close spaced relation to one edge and said one edge having flanges extending inwardly toward each other from the adjacent legs and forming said one edge of the rail, the space between the adjacent legs of the rail at the other side of the H-shaped cross section from said transversely extending flanges to receive a panel portion, the transversely extending flanges on said rail being spaced from said web a distance approximately equal to the thickness of the bight portion of said stile, said stile at the joining end corner having its leg portions removed to leave an extending bight portion of said U-shaped channel, said extending bight portion having the outer end portion thereof bent transversely in from the adjacent extending bight portion for a tongue, the stile and rail adjoining ends being received in abutting relation, said tongue being frictionally received and securely held in the adjacent end of the rail in said space between its cross web and said inwardly extending flanges, said transversely extending flanges and the cross web of the rail fitting tightly against the adjacent faces of the tongue portion of the rail received therebetween.

7. A corner structure in a frame according to claim 6 wherein said legs of the stile and the rail adjacent their panel receiving portions having longitudinally extending struck in relatively wide and shallow recesses thereby rendering the outer ends relatively springy to receive and clasp a panel therebetween.

References Cited by the Examiner

UNITED STATES PATENTS 2,840,161 6/1958 Alexander et al. _____ 189—76
2,918,708 12/1959 Sharp et al. _____ 160—381 X

FOREIGN PATENTS 661,344 11/1951 Great Britain.

HARRISON R. MOSELEY, *Primary Examiner.*

K. DOWNEY, *Assistant Examiner.*